April 6, 1965  H. C. JOHNSON  3,176,858
EQUIPMENT FOR LOADING PALLETS
Filed Jan. 16, 1961  5 Sheets-Sheet 2
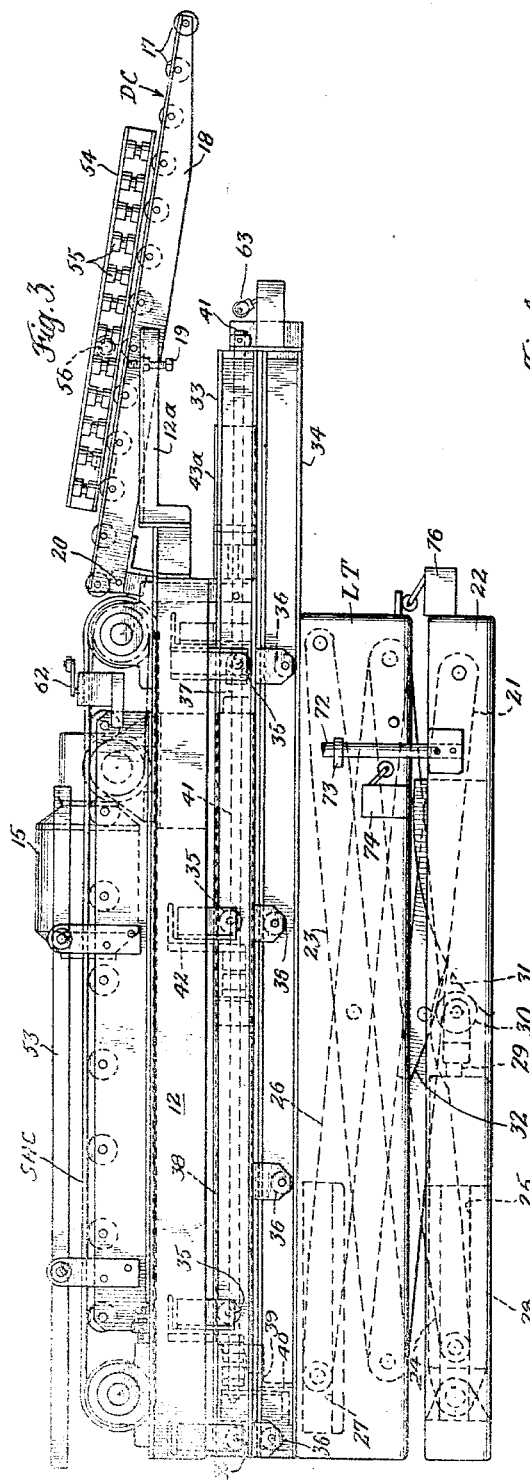
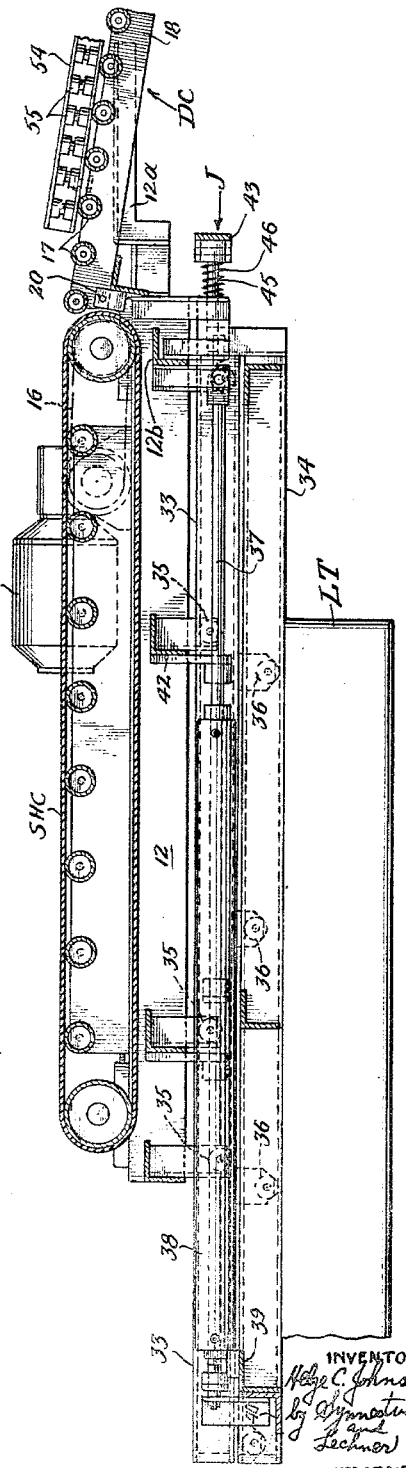

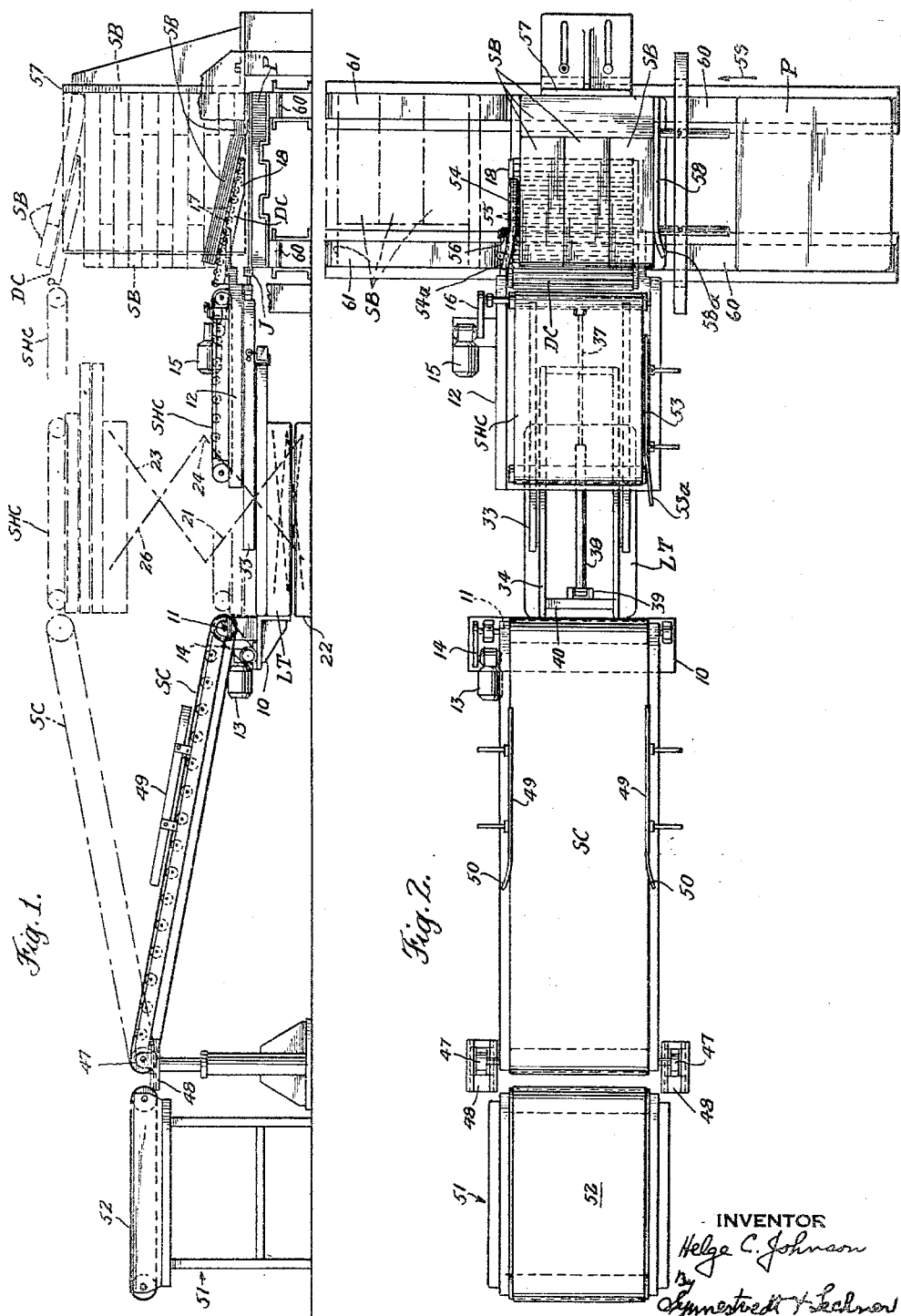

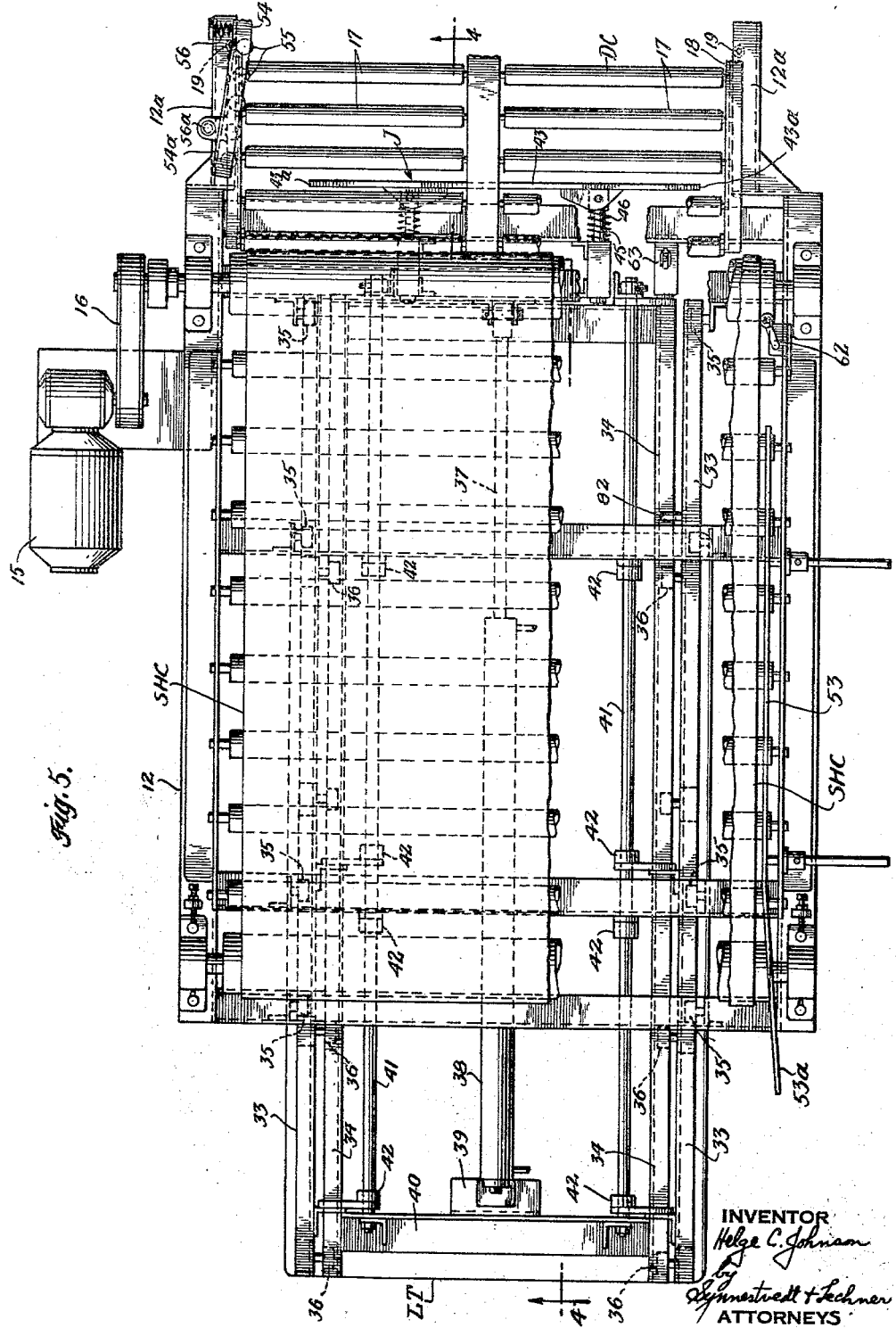

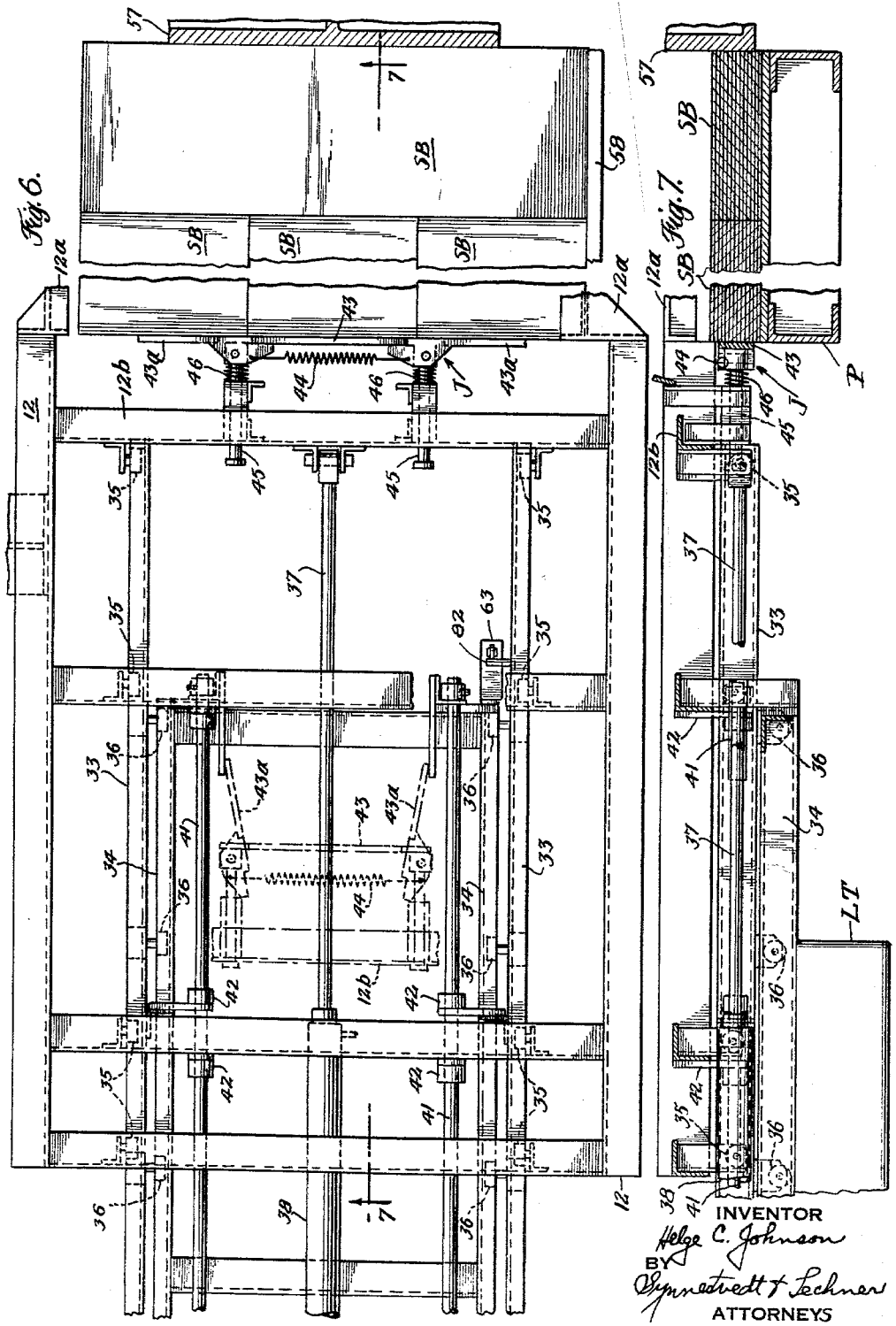

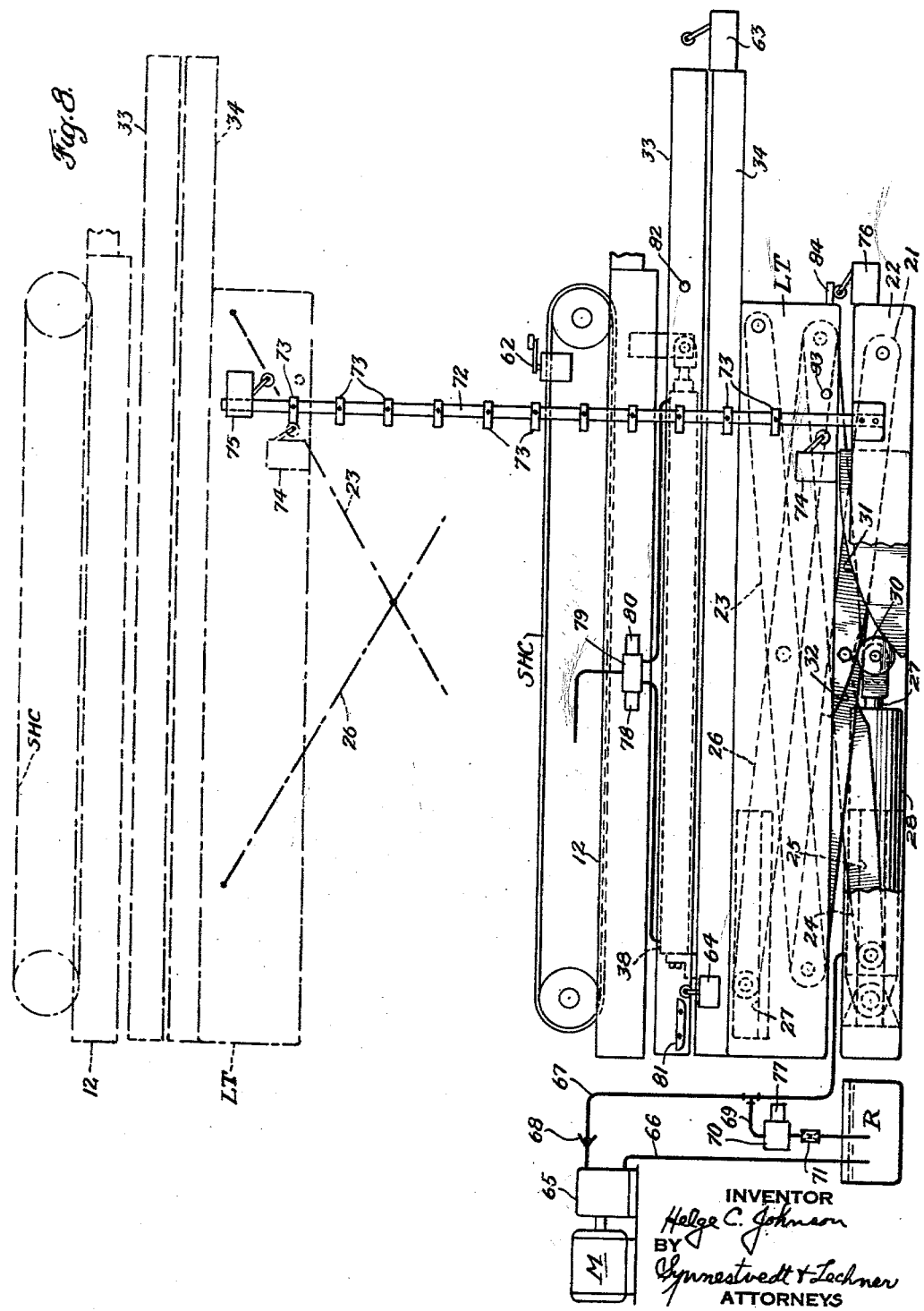

United States Patent Office 3,176,858
Patented Apr. 6, 1965

3,176,858
EQUIPMENT FOR LOADING PALLETS
Helge C. Johnson, West Chester, Pa., assignor to Certain-Teed Products Corporation, Ardmore, Pa., a corporation of Maryland
Filed Jan. 16, 1961, Ser. No. 82,893
9 Claims. (Cl. 214—6)

This invention is concerned with the loading of pallets such as are employed in factories, warehouses or the like where it is useful or convenient to stack various articles, packages or bundles especially in group patterns or assemblies for ease of transfer from place to place, for temporary storage or for any purpose where it is desired to pile a series of load layers one upon another.

The invention has been developed and is particularly useful for the stacking of bundles of shingles for which reason it will be described as applied to this field although its principal features can be employed for other purposes so that it should not be consideerd as being limited to the handling of shingle bundles.

The principal objects of the invention are to provide pallet loading equipment which can handle a complete bundle pattern for each load layer; to reduce the number of operations and the time required to load a pallet; to materially shorten the interval of time which elapses between the placement of the last load layer on a pallet and the placement of the first layer on the succeeding pallet; to raise and lower the loading mechanism instead of the empty and loaded pallet; to minimize wear and tear and reduce the cost of maintenance; and generally to improve equipment of the kind described and render it more dependable in service.

How the foregoing objects, together with such others as may appear hereinafter, are attained is illustrated in the accompanying drawings, wherein FIG. 1 is a somewhat diagrammatic elevational view illustrating the principal parts of my improved equipment in full lines in the positions they assume when the first pattern of four bundles of shingles is being placed on a pallet and showing, in dot and dash lines, the positions of the parts when the last load layer or bundle pattern is being delivered to the top of the pile or stack;

FIG. 2 is a plan view of FIGURE 1 illustrating an empty pallet positioned at one side on a cross conveyor in readiness to be moved to the stacking station; another pallet at the stacking station receiving its first layer of shingle bundles and a third pallet at the opposite side with its stack of bundles in dot and dash lines in place on the pallet;

FIG. 3 is an enlarged elevational view of a shuttle conveyor mechanism used with my equipment, the mechanism being shown in its retracted and lowered position as will further appear;

FIG. 4 is a sectional elevational view taken approximately on the line 4—4 of FIG. 5 showing the shuttle conveyor advanced to an intermediate position;

FIG. 5 is a plan view of FIG. 4 with a portion of the conveyor belt broken out;

FIG. 6 is a plan view of the shuttle conveyor frame, the floating rails, the fixed rails, the piston and cylinder for moving the shuttle conveyor back and forth and the jogger mechanism used with my invention; the jogger being shown in its retracted position in dot and dash lines to illustrate certain of its details;

FIG. 7 is a longitudinal section on the line 7—7 of FIG. 6 and shows the shuttle conveyor in its position of delivering the second bundle layer to the pallet with the jogger "squaring in" the first bundle layer; and FIG. 8 is a diagrammatic elevational view illustrating a control system which can be employed with the equipment.

As will be clear from the drawings the principal features of my improved pallet loading equipment comprise a lift table LT, a belt-type supply conveyor SC secured to the table at one side thereof by means of a suitable bracket 10 and a pivot 11, a shuttle conveyor SHC also of the belt type having a frame 12 mounted on the lift table so that the whole conveyor with its frame can reciprocate bodily toward and away from the pivot 11 of the supply conveyor, and a discharge conveyor DC secured to the framework 12 of the shuttle conveyor so as to reciprocate therewith. The supply conveyor is preferably power driven by a motor 13 and a belt 14. The shuttle conveyor preferably is also power driven by means of a motor 15 and a belt 16 or other suitable driving connection. The discharge conveyor is preferably a gravity feed conveyor consisting of a series of rollers 17 carried in framework 18, the inclination of which framework and therefore of the discharge conveyor can be adjusted slightly by means of adjusting screws 19 which react between an extension 12a on the shuttle conveyor frame and the framework 18 as shown to best advantage in FIG. 3. The pivot point 20 of the framework 18 and therefore of the discharge conveyor DC is located immediately adjacent the discharge end of the shuttle conveyor in position to receive bundles from the shuttle conveyor. By changing the inclination of the discharge conveyor it can be made to handle bags, bundles or other packages having varying coefficients of friction. For example, in handling relatively soft materials the inclination might be somewhere around 8° whereas for handling stiff or rigid materials the inclination might be as little as 2° to 3° from the horizontal. This is a detail which can be readily determined in the field.

The lift table can be raised and lowered in any desired manner the details of which form no part of the present invention, although I have illustrated a lazy tongs or scissors lift type of equipment for this purpose, such as made by The Southworth Co. Briefly one link 21 of the tongs is pivotally connected to the base member 22 of the lift table at the right hand side, as viewed in FIGS. 3 and 8, and this link is connected to another link 23 which is pivoted at the right to the lift table LT, also as viewed in FIGS. 3 and 8. Still another link 24 slides in a horizontal guide slot 25 in the base member 22 at the left hand side thereof and is connected to still another link 26 which slides in a similar guide slot 27 at the left hand portion of the lift table. Thus there are two sets of links which are connected together at the center by means of suitable pivot pins in the manner well understood in this art. Furthermore, as indicated, the lift table might be raised and lowered by other suitable means although the lazy tongs type of lift has been found to be satisfactory for the purposes of this invention.

The tongs are extended in order to raise the table by means of a hydraulic cylinder and piston mechanism 28—29, the piston 29 having a crosshead with rollers 30 at each end which operate between fixed cams 31 carried by the base member 22 and opposing cams 32 carried by a lower pivoted link. When hydraulic pressure is admitted to the left hand end of the cylinder as viewed in FIGS. 3 and 8 the rollers 30 ride up the first cams 31 and push against the cams 32 of the pivoted levers in order to raise the lift table. As the tongs open up the upper and lower links slide inwardly in the guide slots in a manner familiar to those skilled in this art.

The framework 12 of the shuttle conveyor is carried on movable or floating rails 33 and fixed rails 34, the frame of the shuttle conveyor having small wheels or rollers 35 which ride in the rails 33 and the floating rails in turn having similar rollers 36 which ride in the fixed rails 34.

The shuttle conveyor is reciprocated by a piston 37 operating in a cylinder 38, the operating fluid employed preferably being compressed air. The air cylinder is secured by a bracket 39 to a cross member 40 extending between the fixed rails 34 and the piston 37 is secured to a cross member 12b of the shuttle conveyor frame 12 in the manner best shown in FIG. 6. Laterally spaced, longitudinally extending, guide rods 41 are carried by the framework of the fixed rails and slider brackets 42 carried by the shuttle conveyor frame as well as by the floating rails slide on these guide rods.

A jogger J is mounted on the front cross member 12b of the shuttle conveyor frame. This jogger is arranged to "square in" the previously stacked bundle layer when the succeeding layer is being delivered to the pile. It consists essentially of a forward plate portion 43 having a hinged extension 43a at each side, which hinged extensions are held in their outwardly extending position by means of a spring 44 as best shown in FIG. 6. The jogger is carried by two pins 45 which extend through the shuttle conveyor frame member 12b. When the jogging action takes place the pins 45 slide in the frame member and the action is cushioned by the springs 46.

When the shuttle conveyor is retracted, i.e., moved to the left, the extensions 43a are folded inwardly as shown in dot and dash lines in FIG. 6. In this way the overall width of the machine can be kept to a minimum and still provide adequate pushing surface for contacting the bundle patterns as they are stacked up on the receiving pallet.

Turning particularly to FIGS. 1 and 2, it will be noted that the supply conveyor is mounted at its left hand end upon suitable bearing blocks 47 which slide in supporting gibs 48 when the opposite or pivoted end of the conveyor moves up and down with the lift table. This conveyor is also provided with side guides 49 which are preferably made so that they can be adjusted slightly inwardly and outwardly and are also provided with flared entrance ends 50 to prevent all possibility of the shingle bundle patterns catching on the guides as they are moved toward the shuttle conveyor.

At the extreme left hand end as viewed in FIGS. 1 and 2 I provide what might be called an assembly table upon which the shingle bundle patterns are received from the production line. This consists of a framework 51 carrying a horizontally disposed conveyor 52 of any suitable type. This conveyor need not be power driven and after the bundle pattern is in position on the conveyor it is moved forward to the receiving end of the supply conveyor from which point onto the final discharge on the pallet the entire action is fully automatic as will further appear.

It should also be noted that the shuttle conveyor is provided with a side guide 53 having its entrance end 53a outwardly flared to avoid catching on the shingle bundles. Similarly the discharge conveyor carries a side guide 54 which can have a flared entrance end 54a. It is also preferable to provide the guide 54 with roller means 55 in order to reduce frictional resistance when the bundles contact the guide. In addition the guide may be biased toward the load on the conveyor by means of spring 56 and pivotal mounting 56a as best seen in FIG. 5.

In connection with the several conveyors I should like to point out that the details relating to the side guides are matters of choice in design and should not be construed as limitations in structure because the structure can be varied as required or desired for the particular service in hand. Also anti-friction rollers similar to the rollers 55 can be used as desired on any of the side guides.

Referring again to FIGS. 1 and 2, I should also like to call attention to the fact that there is a rear wall 57 and a side wall 58 at the point where the pallets are loaded both of which walls are adjustable so that load layers of different size may be conveniently accommodated. The side wall 58 has a flared entrance end 58a in order to minimize interference with the incoming bundles. As shown in FIG. 2 the empty pallets P come in at one side in the direction indicated by the arrow 59, the framework of the bin where the stacking takes place being formed to provide the necessary clearance space. The empty pallets come in on a powered conveyor 60 and this conveyor is continued into the loading position opposite the end of the discharge conveyor. The loaded pallet is then delivered to a gravity conveyor 61 at the opposite side of the loading mechanism from which conveyor it can be taken to any desired location.

The operation of the structure so far described will now be apparent but it will be summarized briefly as follows. A load layer or bundle pattern of shingles is delivered to the assembly table or patterning conveyor 52 shown at the left in FIGS. 1 and 2. If shingles are being handled in accordance with the assumption at the beginning of this specification they are generally arranged in patterns of four shingle bundles to a layer with three bundles parallel to one another and with a fourth bundle at right angles to the other three and lying across the ends of the first three. Such a pattern is illustrated at the right hand end of FIG. 2 where three shingle bundles SB are arranged in side by side relationship with their longitudinal axes in parallelism and with the fourth bundle SB arranged across their ends immediately adjacent the rear wall 57 of the stacking bin. The next layer or bundle pattern will be the same except that the transverse bundle will be located at the other end of the three parallel bundles. The layers are alternated in this way in order to form a more secure stack in accordance with principles well understood in this art and such a stack is shown in dot and dash lines at the right hand end of FIG. 1.

A succession of such alternately arranged shingle bundle patterns is delivered from the assembly conveyor 52 to the supply conveyor SC which conveyor carries the patterns forward to the shuttle conveyor SHC. When the layer or pattern arrives on the shuttle conveyor this conveyor moves outwardly toward the stacking bin and during the process it transfers the bundle pattern to the discharge conveyor which gravity feeds and drop the layer upon the pallet as the shuttle conveyor is retracted. When the next pattern layer arrives at the stacking point the lift table rises sufficiently to clear the first layer and when the shuttle conveyor moves outwardly to discharge its load on top of the first bundle layer the jogger mechanism J "squares in" the first layer.

The foregoing process is repeated until the load is stacked with as many layers as desired and each time that another layer is dropped into position on the previously delivered layer the lift table moves upwardly as described.

Various systems for controlling the operation of my improved pallet loading equipment can be employed and I will describe one which is suitable and which I have found to be completely satisfactory although I want it to be understood that other arrangements can be designed to do an equally effective job.

As indicated above the toggle motor device 28–29 is hydraulic and a pump 65 circulates the operating fluid from the reservoir R to the cylinder through the lines 66 and 67, the latter being provided with a check valve 68. A motor M drives the pump. A return line 69 connects the line 67 with the reservoir R and in the line 69 is a valve 70 for controlling the flow therethrough. There is also a restricted orifice 71 in the line 69 between the valve 70 and the reservoir.

A vertical rod 72 is secured to the base 22 and this rod carries a series of vertically spaced lugs 73, eleven in the arrangement illustrated.

With the lift table LT in its lowermost position and with the shuttle conveyor SHC retracted as shown in FIG. 8, the shuttle conveyor forward motion switch 62, the shuttle conveyor retract switch 63, and the pump motor single action starting switch 64 are all open. The latter is a standard switch which, when actuated to the right from its normally open position (FIG. 8) remains open and, when actuated to the left from its normal position, it closes. At this time the pump motor switch 74 and the lift table lowering switch 75 are also open but the lift table bottom limit switch 76 is closed. This latter energizes the solenoid 77 of the hydraulic valve 70 and moves it to closed position in order to prevent discharge of fluid into reservoir R. Then, when pump 65 is started by motor M, hydraulic fluid is delivered through line 67 past check valve 68 to the cylinder 28 of the lifting mechanism.

When a bundle pattern or other package is moved forward by the shuttle conveyor it engages and closes switch 62. This energizes the forward motion solenoid 78 of the air valve 79 opening the same and permitting operating air to enter the cylinder 38 to effect forward motion of the shuttle conveyor. When the pattern or package leaves the shuttle conveyor the switch 62 again opens.

When the shuttle conveyor reaches the end of its forward movement retract switch 63 closes and energizes retract solenoid 80 of air valve 79 to cause retraction of the shuttle conveyor SHC.

Toward the end of the retract stroke of the shuttle conveyor the cam 81 closes switch 64 to start the motor M of the hydraulic pump 65 thus delivering fluid pressure to the left end of hydraulic cylinder 28 to move piston 29 to raise the lift table. At the end of the retract stroke the cam 81 leaves the switch 64 thereby permitting the switch to open.

By this time the lift table has been raised an amount sufficient to bring switch 74 into engagement with the lowermost lug 73 on the fixed rod 72 thereby closing switch 74 and stopping pump motor M of the hydraulic pump 65. This holds the fluid in the pressure line 67 leading to the cylinder 28 and the lift table remains in this first step position of its upward movement. It should be noted in this connection that cylinder 28 cannot exhaust to the reservoir R because valve 70 is closed.

When the next package or bundle pattern to arrive on the shuttle conveyor engages and closes switch 62, the conveyor again moves forward until switch 63 is closed to cause the conveyor to again retract. Toward the end of the retract movement cam 81 once more closes switch 64 to again start the motor M and the pump 65 to raise the lift table another step.

The cam 81 is of such length that it holds switch 64 closed until after switch 74 has passed the lug 73, otherwise switch 74 would stop the motor M and prevent the lift table from being raised. Furthermore, the cam 81 is also of a length sufficient to permit the lift table to be raised to a height such that switch 74 will engage the next higher lug 73 at which time the cam 81 allows switch 64 to open.

Since the hydraulic pump is now stopped the lift table remains in this second stop position until the next forward and retract movement of the shuttle conveyor is completed and this action goes on until the switch 74 engages the uppermost lug 73 as shown in dot and dash lines in FIG. 8. With the lift table stopped in the upper position a twelfth package or bundle pattern is delivered to the shuttle conveyor and, as before, the conveyor moves forward and retracts. On the twelfth retraction switch 64 is again closed by the cam 81 to raise the lift table in what may be termed an idle lift because this final lift is merely for the purpose of causing engagement with and closing of the lift lowering switch 75. Closing of switch 75 actuates hydraulic valve 70 to its position which allows cylinder 28 to exhaust to the reservoir R and this permits the lift table to be lowered to its bottom position in order that the whole cycle may be repeated. The restricted orifice 71 already referred to is provided in order to give a gradual lowering action to the lift and the check valve 68 is provided in the pressure line 67 in order to prevent the exhausting fluid from entering pump 65. When the lift reaches its lowermost position switch 76 is closed to actuate valve 70 to its position which closes the exhaust line 69 so that the operating fluid can again reach cylinder 28 when the pump 65 is next started.

In connection with the foregoing operational description the following points should be noted. The vertical rod 72 is secured to the base 22 of the lift and the machine as illustrated is intended to place twelve bundle patterns upon each pallet. For this reason the rod carries eleven lugs 73 because this number of lugs is all that is required to handle twelve bundle patterns or packages because the first package or bundle pattern is delivered to the pallet in the stacking bin when the lift table is in its lowermost position and therefore the bottom lug 73 on the rod 72 stops the lift in position to deliver the second package or bundle pattern to the pallet in the stacking bin.

Switch 62 is mounted on the framework of the shuttle conveyor and is actuated by the packages or bundle patterns as they are moved by the shuttle conveyor. Switch 63 is mounted on the lower or fixed rails of the shuttle conveyor and this switch is actuated by a pin 82 affixed to the floating rails. Switch 64 is mounted on the fixed rails and is actuated by the cam 81 which latter is secured to the floating rails. Switch 74 is mounted on the lift table and is actuated by the lug 73 on the rod 72 when the lift table is raised. Switch 75 is mounted on the top of rod 72 and is actuated by a pin 83 on the lift table. Switch 76 is mounted on the base of the lift table and is actuated by a pin 84 on the lift table. The motor M, the pump 65 and the valves 70 and 79 may be mounted at any convenient point.

Attention should also be called to the fact that when the shuttle conveyor first begins to move forward it does so on the floating rails and when its leading wheels engage the end stops of the floating rails these rails are carried forwardly with the frame of the conveyor as the operating piston 37 continues to move. When the leading wheels of the floating rails engage the end stops of the fixed rails forward movement ceases. In reverse motion the shuttle conveyor frame first retracts and when its rear wheels engage the rear end stops of the floating rails the floating rails are retracted with the conveyor frame. Final retraction stops when the rear wheels of the floating rails engage the rear end stops of the fixed rails.

In conclusion I wish to emphasize the fact that the control system illustrated is not to be considered in any way limiting because many ways of controlling the motions of the shuttle conveyor or other parts of the mechanism can be adopted but the one I have illustrated has been tried and found efficient and accurate. Nevertheless, it is obvious that other mechanical arrangements could easily be devised for accomplishing the various motions of the machine or indeed that suitable electrical devices can be employed for accomplishing the ends desired. The control shown is designed to handle bundle patterns of uniform thickness but if patterns or packages of different thicknesses are to be palletized the limit switches would have to be readjusted as is obvious to anyone skilled in the art of controlling machine operations. It is also obvious that a mechanical system can be replaced with an electrical eye which will cause raising of the lift table to a point just above the last layer to have been delivered to the pallet regardless of the thickness of the package or pattern bundle. The principal point, of course, is to provide for just sufficient lift of the table to permit the succeeding package or bundle pattern to clear the previously palletized package or bundle layer. Features of this kind can be varied almost indefinitely and, as indicated, the particular control mechanism illustrated should not be taken as limiting the invention except as defined in the accompanying claims.

I claim:

1. Equipment for stacking a series of completed load layers on a pallet comprising a lift table, a shuttle conveyor frame carried by the lift table and mounted thereon to move bodily as a unit back and forth across the table top, power means on the lift table for effecting said movement of the shuttle conveyor frame, conveyor mechanism mounted upon and movable with said frame including means also movable with said frame for actuating said conveyor mechanism, said shuttle conveyor mechanism being adapted to receive a completed load layer when the shuttle conveyor frame is at one side of its stroke, a discharge conveyor attached to the shuttle conveyor frame at its opposite side in position to receive a completed load layer from the shuttle conveyor mechanism when said shuttle conveyor frame is at the opposite side of its stroke and to deliver the same to the pallet, and means operating to raise the lift table with the shuttle conveyor frame and the discharge conveyor after the discharge conveyor delivers a load layer to the pallet, the degree of lift being sufficient to permit delivery of the succeeding load layer on top of the layer already in place.

2. Equipment according to claim 1 wherein the shuttle conveyor carries a jogger which "squares in" the load previously delivered to the pallet as the discharge conveyor delivers the succeeding load.

3. Equipment according to claim 1 wherein the discharge conveyor is a gravity conveyor pivoted on the shuttle conveyor and wherein the angle of the discharge conveyor is adjustable on said pivot to permit handling of loads having different coefficients of friction.

4. Equipment for stacking a series of load layers on a pallet comprising a lift table, a supply conveyor pivoted on a side of the table, a shuttle conveyor mounted on the table to reciprocate bodily toward and away from the pivot of the supply conveyor and adapted to receive a load layer from the supply conveyor when in position adjacent the supply conveyor, power means for reciprocating the shuttle conveyor, a discharge conveyor pivoted to the shuttle conveyor on the side opposite the supply conveyor in position to receive a load layer from the shuttle conveyor and to deliver the same to the pallet, and means operating to raise the lift table with the shuttle and discharge conveyors after the discharge conveyor delivers a load layer to the pallet, the degree of lift being sufficient to permit delivery of the succeeding load layer on top of the layer already in place.

5. Equipment according to claim 4 wherein the discharge conveyor is a gravity conveyor and wherein the angle of said discharge conveyor is adjustable on its pivot to permit handling of loads having different coefficients of friction.

6. Equipment according to claim 1 wherein a supply conveyor is provided with an end thereof pivoted to the lift table in position to deliver load layers to the shuttle conveyor as described, said pivoted end of the supply conveyor also being adapted to move with the lift table.

7. Equipment for stacking a plurality of completed layers of bundle patterns to form a load adapted to be handled as a unit, comprising a lift table, means for raising and lowering the table, a shuttle conveyor frame carried by the lift table and mounted thereon to move bodily as a unit back and forth across the table top, power means on the lift table for effecting said bodily movement of the said shuttle conveyor frame, conveyor mechanism mounted upon and movable as a unit with said frame, means also moving with said frame for actuating said conveyor mechanism, means for delivering to said conveyor mechanism a completed layer for the load when the shuttle frame is at one end of its movement, a discharge conveyor attached to the shuttle conveyor frame at the opposite end in position to receive a completed load layer from the shuttle conveyor mechanism during movement of said shuttle frame across said table top to load depositing position and to deliver the same to the load, means operable by said layer when a completed layer is deposited on said conveyor mechanism to actuate said power means, and means to effect raising of the lift table with the shuttle conveyor frame and the discharge conveyor after the discharge conveyor delivers a layer to the load, the degree of rise being sufficient to permit delivery of the succeeding load layer on top of the layer already in place.

8. Equipment according to claim 7 wherein the means for delivering loads to the shuttle conveyor mechanism includes a supply conveyor adapted to discharge load layers to the shuttle conveyor, said supply conveyor being constructed and arranged to effect delivery of succeeding load layers in the successively raised positions of the shuttle conveyor.

9. Equipment according to claim 7 wherein the shuttle conveyor carries a jogger which "squares in" the previously delivered layer as the discharge conveyor delivers the succeeding layer.

References Cited in the file of this patent

UNITED STATES PATENTS

| | | |
|---|---|---|
| 970,366 | Barber | Sept. 13, 1910 |
| 1,566,701 | Schumacher | Dec. 22, 1925 |
| 1,711,820 | Wilcke | May 7, 1929 |
| 1,786,622 | Layer | Dec. 30, 1930 |
| 1,801,822 | Sutherland | Apr. 21, 1931 |
| 2,065,674 | Fay | Dec. 29, 1936 |
| 2,093,388 | Maine | Sept. 14, 1937 |
| 2,549,202 | Idelman | Apr. 17, 1951 |
| 2,744,644 | Hackney | May 8, 1956 |
| 2,870,922 | Thomson | Jan. 27, 1959 |
| 2,973,878 | Gibson | Mar. 7, 1961 |

FOREIGN PATENTS

| | | |
|---|---|---|
| 558,378 | Canada | June 3, 1958 |
| 1,005,904 | Germany | Apr. 4, 1957 |